United States Patent

[11] 3,576,981

[72] Inventors Kiyokazu Okamoto; Masayuki Miyazaki, Tokyo, Japan
[21] Appl. No. 716,954
[22] Filed Mar. 28, 1968
[45] Patented May 4, 1971
[73] Assignee Nippon Electric Company, Limited Tokyo, Japan
[32] Priority Mar. 31, 1967
[33] Japan
[31] 42/20527

[54] DIGITAL INTERPOLATOR WITH A CORRECTIVE DISTRIBUTION COMMAND DEVICE
16 Claims, 12 Drawing Figs.

[52] U.S. Cl. 235/152, 318/573
[51] Int. Cl. G06f
[50] Field of Search 235/151, 11; 318/20.130, 20.108, 20.105, 20.110

[56] References Cited
UNITED STATES PATENTS
3,416,056 12/1968 Motooka et al. 235/151.11(X)

*Primary Examiner*—Eugene G. Botz
*Attorney*—Marn and Jangarathis

ABSTRACT: A corrective digital interpolator providing sequential steps in X and Y coordinates for tracing new curves from a prototype curve and for minimizing deviations of the new curve from the prototype curve, comprising translating coordinate signals and distribution signals representing, for example, a direction (vertical) other than the direction (horizontal) corresponding to a maximum component (horizontal) of a vector at different followup points, translating the other signals into corrective signals in such manner that the latter signals have a ratio of 3 to 2 relative to the other signals, and translating distribution command rate signals and corrective signals into corrected command rate signals for minimizing the deviations of the new curves from the prototype curve, the latter signals comprising logic sums of the distribution command rate signals and the corrective signals.

INVENTORS
Kiyokazu Okamoto
Masayuki Miyazaki
BY
Marn & Jangarathis
ATTORNEYS

INVENTORS
Kiyokazu Okamoto
Masayuki Miyazaki
BY
Mann & Jangarathis
ATTORNEYS

*INVENTORS*
Kiyokazu Okamoto
Masayuki Miyazaki
*BY*
Marn & Jangarathis
*ATTORNEYS*

DIGITAL INTERPOLATOR WITH A CORRECTIVE DISTRIBUTION COMMAND DEVICE

The invention relates to a digital interpolator for use in numerical control.

A conventional digital interpolator comprises a command unit and a distributor. The command unit is set into operation by the information supplied thereto from a perforated tape, for example, read by the pertinent portion of the peripheral apparatus. The information, called hereinafter the information A, prescribes the command feed rate $V_o$. The command unit thus generates a distribution command signal pulses whose repetition period is 1/(command feed rate $V_o$). The manner of operation of the distributor is determined by the information of another type. This latter information, which is hereinafter named the information B, prescribes the curve to be traced, the coordinates of followup points positioned within the adjacency of the curve, the one-step coordinate variations assigned to the followup points, respectively, and the sense of followup. The distributor, supplied with the distribution command signal, generates a distribution signal pulse when the distributor receives each of the distribution command signal pulses. The distribution signals control the member, such as a tool, to be numerically controlled.

Such a conventional digital interpolator has two strong points. One is simpleness of the structure. The other is very small deviation of the position of the numerically controlled member from the desired curve. The deviation is less than unit or $1/\sqrt{2}$ length of one step or maximum. The interpolator however, has one weak point. Deviation between the actual macroscopic feed rate V and the command feed rate $V_o$ varies with the slope of the curve to be traced.

With a conventional digital interpolator, as large as 30 percent deviation occurs between the command feed rate $V_o$ and the actual feed rate V when the slope of the curve to be traced is 45°. In the case of metal cutting, this causes variation of the cutting reaction and undesirable variation of flexture of the tool. These result in an irregular cut face. In the case of optical drafting of figures, the large deviation between the feed rates causes variation of the amount of light to be supplied per unit area per unit time and unwanted variation of thickness of the drawn lines. These result in an irregular drawing. In the case of gas cutting, the feed rate variation causes variation of the amount of the heat to be supplied per unit area per unit time and unexpected variation of cutting area. These result in an irregular gas-cut surface. It has thus hardly been possible to expect fine working with a conventional digital interpolator. It has been proposed to decrease this defect by programming.

Programming, however, requires a division of the curve into many sections and a correction of the command feed rate $V_o$ of each section according to the mean slope of the curve section. This is extremely troublesome.

An object of the present invention is to provide a digital interpolator which improves the quality of working in numerical control.

Another object is to provide a digital interpolator which decreases the large deviation between the actual macroscopic feed rate V and the command feed rate $V_o$.

A further object is to provide a digital interpolator which has very simple structure and yet performs fine working.

The invention is readily understood from the following description taken together with the accompanying drawing in which.

Figure 1:
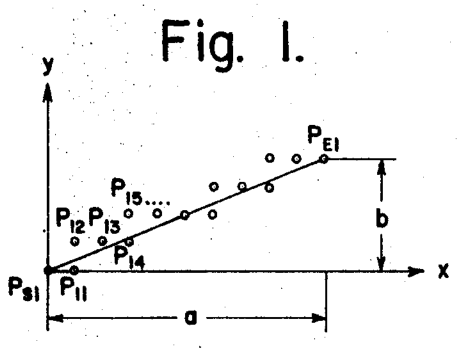
FIGS. 1 and 2 show examples of a series of followup points specified by a conventional digital interpolator corresponding to the command unit and the distributor of FIG. 9.
Figure 2:
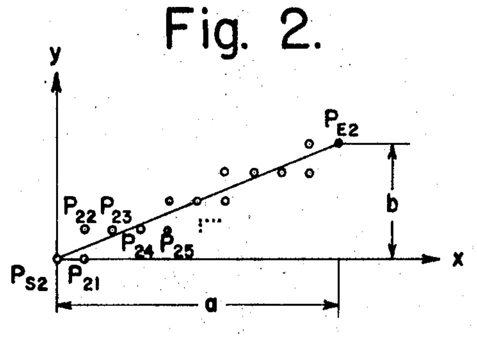

FIGS. 1 and 2 show examples of a series of followup points (points of $P_{S1}$, $P_{11}$, $P_{12}$, $P_{13}$, ... $P_{E1}$ in FIG. 1 and points of $P_{S2}$, $P_{21}$, $P_{22}$, $P_{23}$, ... $P_{E2}$ in FIG. 2) which move according to the distribution signals generated by two different distributors whose operations differ from each other. The curves to be followed are a segment indicated by starting point $P_{S1}$, and end point $P_{E1}$ and a vector $\overrightarrow{P_{S1}P_{E1}}$ (components *a* and *b*) and a segment indicated by starting point $P_{S2}$, an end point $P_{E2}$ and a vector $\overrightarrow{P_{S2}P_{E2}}$ (components *a* and *b*). The distribution directions allowed at each followup point are directions of $+x$ and $+y$ corresponding to the sign of a particular component of tangential vector ($\overrightarrow{P_{S1}P_{E1}}$ or $\overrightarrow{P_{S2}P_{E2}}$) in FIGS. 1 and 2.

The tangential vector is defined as follows:

1. its direction is orthogonal to that normal of the curve to be traced which passes the followup point in question; and
2. its sense is in accordance with the sense of the followup point.

Figure 7:
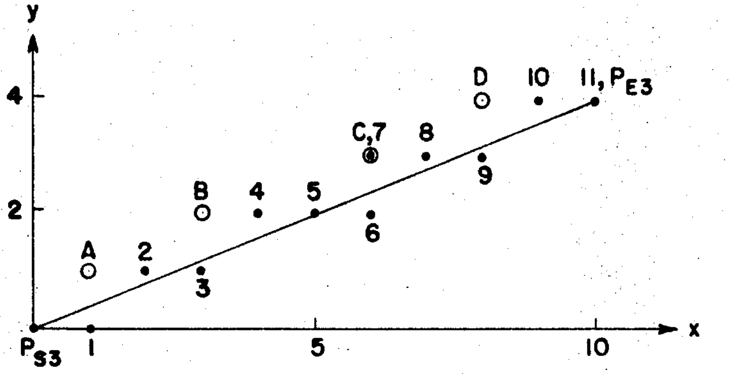
FIG. 7 and 8 show examples of a series of followup points together with starting and terminating points of a straight line and a circular arc, the followup points being specified by the present invention in FIG. 9.
Figure 8:
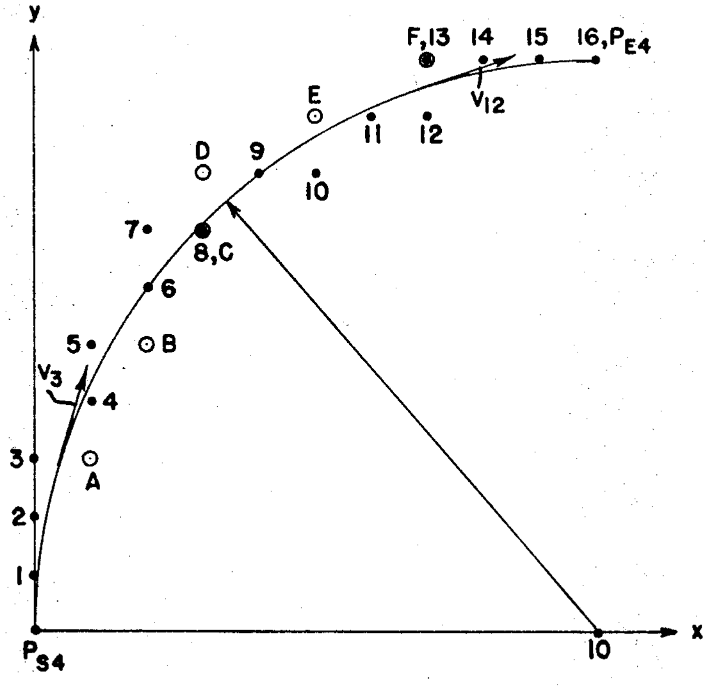

With the present invention, only its direction and its sense have concern but its absolute magnitude has no concern. In FIGS. 1 and 2, the tangential vector is $\overrightarrow{P_{S1}P_{E1}}$ and $\overrightarrow{P_{S2}P_{E2}}$. In FIG. 7, the vector is $\overrightarrow{P_{S3}P_{E3}}$. In FIG. 8, the vector successively varies with the slope. Examples at the followup points 3 and 12 in FIG. 8 are shown as the vectors $v_3$, $v_{12}$, respectively.

The operation shown in FIG. 1 of a distributor known in the prior art such as illustrated in FIGS. 7*a* and 7*b* of U.S. Pat. No. 3,254,203, is that a region is divided into (+) and (−) areas having a curve-to-be-traced as a line of demarcation (the line of demarcation is included in (+) for the sake of convenience) as mentioned below. When the followup point is within the (+) region, the direction of operation is arranged to be directed toward the (−) region, for instance, $P_{S1} \rightarrow P_{11}$, and when the followup point is within the (−) region, the direction of operation is arranged to be directed toward the (+) region, for instance, $P_{11} \rightarrow P_{12}$, while the maximum deviation between successive followup points in the curve to be traced is assured to be within a length of one step.

The operation shown in FIG. 2 of a distributor known in the prior art such as illustrated in Japanese Pat. Publication No. 11935/66, is that deviations between followup-points-to-be which exist, along the above-described allowable directions ($+x$, $+y$), at lattice points adjacent to the present followup point and a curve to be followed up are compared and the followup point is to be transferred to a followup-point-to-be whose deviation is smaller, for instance, $P_{S2} \rightarrow P_{21} \rightarrow P_{22} \rightarrow P_{23} \rightarrow P_{24} \rightarrow P_{25}, \ldots P_{E2}$, while the maximum deviation between the followup point and the curve to be traced is assured to be within $1/\sqrt{2}$ of a length of one step. The feature of the distributor which performs the above-described operation is that it involves not only operational precision, but also a scale simplicity of structure. This simplicity cannot be seen in a digital interpolator combined with a digital differential analyzer. However, a distributor performing the foregoing operations has a demerit of a large deviation developed between a command feed rate $V_o$ and an actual macroscopic feed rate V according to the slope (*b*/*a* in examples of FIGS. 1 and 2) of a curve to be traced. A further explanation is given in the following.

The relation between the above-described feed rates $V_o$ and V will be explained hereinafter. In FIGS. 1 and 2, a time duration $t$ required for a followup point to travel the distance $L=a^2+qb^2$ from the point $P_{S1}$ or $P_{S2}$ to the point $P_{E1}$ or $P_{E2}$ is $t=t_o(|a|+|b|)=1/V_o(|a|+|b|)$, because the number of times of pulse distribution performed at a time interval of $t_o=1/V_o$ is $(|a|+|b|)$.

Here the macroscopic feed rate V is defined as follows:

$$V=\frac{L}{t}=V_0\frac{\sqrt{a^2+b^2}}{|a|+|b|},\text{ where }(|a|+|b|\neq 0) \quad (1)$$

From Equation (1), the normalized feed rate $v$ is, by taking up the ratio of the actual feed rate V and the command feed rate $V_o$, assumed as:

$$v=\frac{V}{V_0}=\frac{\sqrt{a^2+b^2}}{|a|+|b|},\text{ where }(|a|+|b|\neq 0) \quad (2)$$

Since Equation (2) is completely symmetrical regarding $a$ and $b$, assuming that $0\leq|b|\leq|a|$, and $$0\leq k=|b|/|a|\leq 1, \quad (3)$$

Equation (4) may also be employed in order to study the range of the normalized feed rate $$v=\frac{\sqrt{1+k^2}}{1+k},\text{ where }(0\leq k\leq 1) \quad (4)$$

The term $\sqrt{1+k^2}$ in Equation (4) is a term corresponding to a distance, the term $1+k$ is a term corresponding to the time duration required for pulse distribution in order to trace the distance $\sqrt{1+k^2}$, and the term $k$ means the slope of a curve to be traced.

Figure 3:
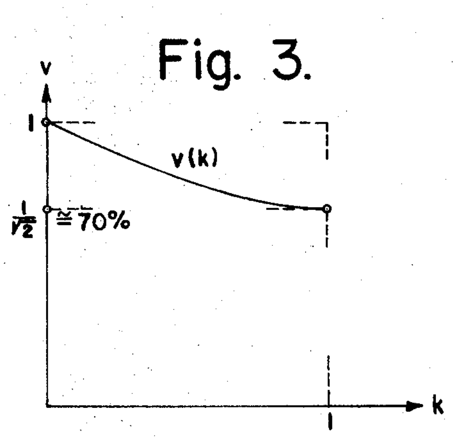
FIG. 3 is a curve illustrating the deviation of a normalized feed rate to unity according to a use of conventional interpolator.

As seen in graph $v(k)$ in FIG. 3, the normalized feed rate $v$ is decreased according as $k$ is increased, and is expressed when $k$ is maximum, via., 1. In other words, when the slope of the curve is 45° as indicated by the 1 axes of the X and Y coordinates in FIG. 3, then $$v_{\min}=\frac{\sqrt{2}}{2}\cong 0.70 \quad (5)$$

This indicates that the deviation E between the actual feed rate and the command feed rate V and $V_o$, respectively, amounts to approximately 30 percent.

Figure 4:
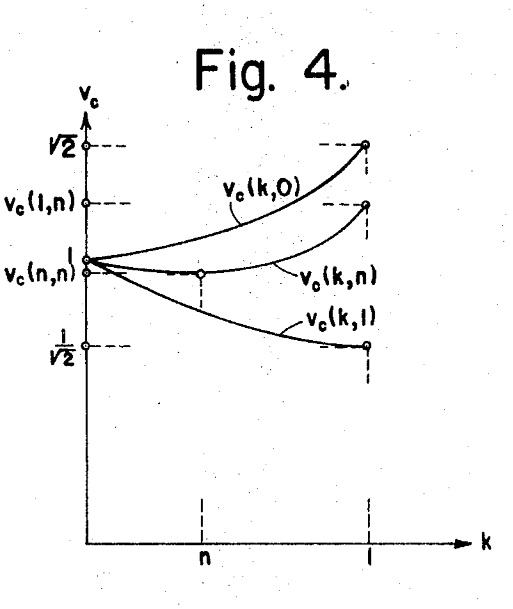
FIG. 4 is a family of curves illustrating a plurality of normalized feed rates and showing one curve which is improved in accordance with the present invention in FIG. 9.

The principle of the present invention which improves the above deviation E is now explained. In Equation (4), the term $1+k$ corresponding to the time duration possibly close to the value of $\sqrt{1+k^2}$ is changed while the term $\sqrt{1+k^2}$ corresponding to a distance is left unchanged. When $k=0$, then the normalized feed rate $v=1$ as shown in FIG. 4. Therefore, it is better not to change the absolute term of $1+k$ so that the terms such as $1+k^1(1+k)^m$, may be taken into consideration. Among these terms, the simplest and most desirable one is a linear expression in the form of $1+nk$. When $0\leq k\leq 1$, then $1\leq\sqrt{1+k^2}\leq 1+k$ so that $$0\leq n\leq 1 \quad (6)$$

in order to hold $1\leq 1+nk\leq 1+k$. In Equation (4), if $1+nk$ is used instead of $1+k$, then the normalized feed rate $v_c(k, n)$ is $$v_c(k,n)=\frac{\sqrt{1+k^2}}{1+nk} \quad (7)$$

FIG. 4 shows the normalized feed rate $v_c(k, n)$ for several values of $n$. Since $$\left.\begin{array}{l}\dfrac{\partial v_c}{\partial k}=\dfrac{k-n}{(1+nk)^2\sqrt{1+k^2}}\\[2ex]\dfrac{\partial v_c}{\partial k}>0(k>n),\ \dfrac{\partial v_c}{\partial k}<0(k<n)\end{array}\right\} \quad (8)$$

when $k=n$, then $v_c(n, n)=1/\sqrt{1+n^2}$ is minimum. Hence, the maximum value of the deviation E is $\{|1-v_c(n,n)|,\ |v_c(1,n)-1|\}_{max}$.

Figure 5:
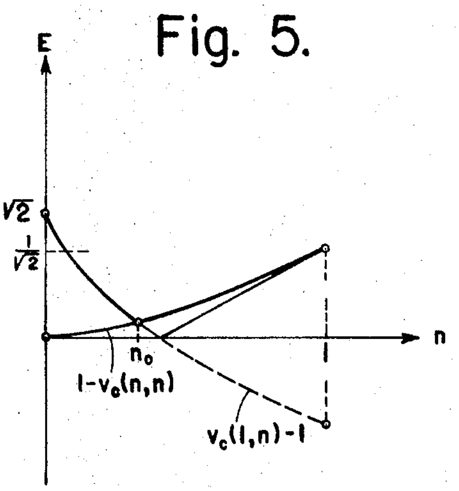
FIG. 5 is a family of curves showing maximum deviation of a normalized feed rate in FIG. 4.

For the object of the present invention, the value $n$ for $E_{min}$ is to be obtained according to the principle of minimax. The graph of deviation $E_{max}$ is shown in FIG. 5. As seen in this FIG., the value of deviation E becomes minimum with $n=n_o$, and the value of $n_o$ is approximately 1/3 if actually sought.

Figure 6:
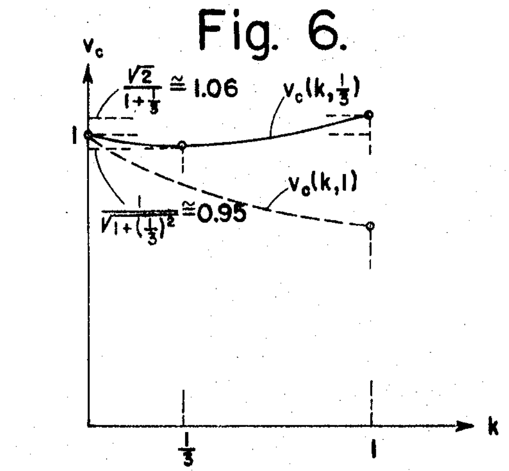
FIG. 6 is a curve of a normalized feed rate according to the present invention in FIG. 9.

In order to embody the present invention, the ideal value of $n(=n_{ao})$ may be used. However, if the actual structure is complicated, it is advantageous to make the structure simple by employing the simple number (rational number consisting of elements of simple natural number) close to $n_o$. As shown in FIG. 5, a simple number in this case becomes 1/3. The normalized feed rate $v_c(k, 1/3)$ with $n=1/3$ according to the present invention is shown in a full line in FIG. 6 whereas the normalized feed rate $v_c(k, 1)$ indicated with a broken line in FIG. 6 is the normalized feed rate $v_c(k)$ in FIG. 3 of a digital interpolator in the prior art. Comparing the two graphs in FIG. 6, it is seen that the value of deviation E is substantially decreased from approximately 30 percent to approximately 6 percent. When $n=1/3$, then $$v_c=\frac{\sqrt{1+k^2}}{1+1/3k}=\frac{\sqrt{a^2+b^2}}{(|a|+|b|)-2/3|b|} \quad (9)$$

The denominator in Equation (9) shows that two-thirds of the time duration required for generating a distribution signal in a direction (viz., the direction corresponding to the component $b$; hereinafter abbreviated a prescribed direction) other than the direction corresponding to the maximum component $a$ of a tangential vector should be subtracted from the time duration required for generating the whole distribution signals which follow up the segment represented with a vector $(a, b)$.

In case of embodying the above-described fact, when a distribution signal in the prescribed direction is generated, the handling of completing the distribution of one more step is made before the succeeding distribution command signal is generated with the number of times of ratio of 3 to 2 against the generated number of times of said distribution signals. As a result, when a segment represented with a vector (10, 4) in FIG. 7 is traced according to the distribution method shown in FIG. 1, then the number of distribution command signals is 11 as evidenced by periods (.), if the present invention is employed.

The points (0) designated with A—D show distributions in the prescribed directions. Among these, with a ratio of two times against three (except the third point C (= a point 7) in an example of FIG. 7), the distribution of one more step (A→2, B→4, D→10) has been completed before the succeeding distribution command signal is generated. As a result, $$v_c=\frac{\sqrt{10^2+4^2}}{11}\cong\frac{10.6}{11}\cong 0.96\text{ (deviation}\cong 4\%\text{) in Fig. 7}$$

while on the other hand, $$v_c=\frac{\sqrt{10^2+4^2}}{14}\cong\frac{10.6}{14}\cong 0.76\text{ (deviation}\cong 24\%\text{)}$$

in the case of a use of the former digital interpolator of the prior art. Thus, it is seen that the deviation E is substantially decreased according to the present invention.

As the explanation was given above mostly to the case of straight lines which were to be followed up, it is seen that the deviation E of the normalized feed rate $v_c(k, 1/3)$ is, as shown in FIG. 6, within approximately 6 percent over the whole region of $0\leq k\leq 1$. This indicates that when the slope of a curve varies, for instance, even when a curve to be traced is a circle or a quadratic curve, the present invention can be expected to perform substantially as in the case of the straight line.

FIG. 8 shows that a circular arc with a radius of 10 is traced from a starting point $P_{S4}$ to a terminal point $P_{E4}$ in accordance with the distribution system shown in FIG. 2. A point marked with a period (.) and a point marked with a zero (0) in FIG. 8 indicate the same sense as the corresponding period (.) and zero (0) in FIG. 7. A mean value of the normalized feed rate $v_c$ in FIG. 8 is $$v_c=\frac{\text{Circumference}\times\frac{1}{4}}{\text{Number of points (.)}}=\frac{2\pi\times 10\times\frac{1}{4}}{16}\cong\frac{15.7}{16}\cong 0.98$$

Thus, the maximum deviation E of the normalized feed rate $v_c$ in FIG. 8 is within approximately 6 percent as shown in FIG. 6.

On the other hand in the case of the prior art digital interpolator, the normalized feed rate $v_c$ varies in accordance with the graph shown in FIG. 3; when $k=1$, the deviation E is maximum, amounting to approximately 30 percent.

Furthermore, the explanation is given above to the case in which the deviation E of the normalized feed rate $v_c$ against 1 is made small. However, by enlarging the object of the present invention, for instance, in order to make the value of $v_c$ larger according as the slope $k$ approaches 1, $n$ should be determined within the range of $n \leq 0$. In order to make $v_c=1$ when $1=k1$, $n$ can also be determined so that $\sqrt{1+k_1^2}/1+_1=1$ is satisfied.

Figure 9:
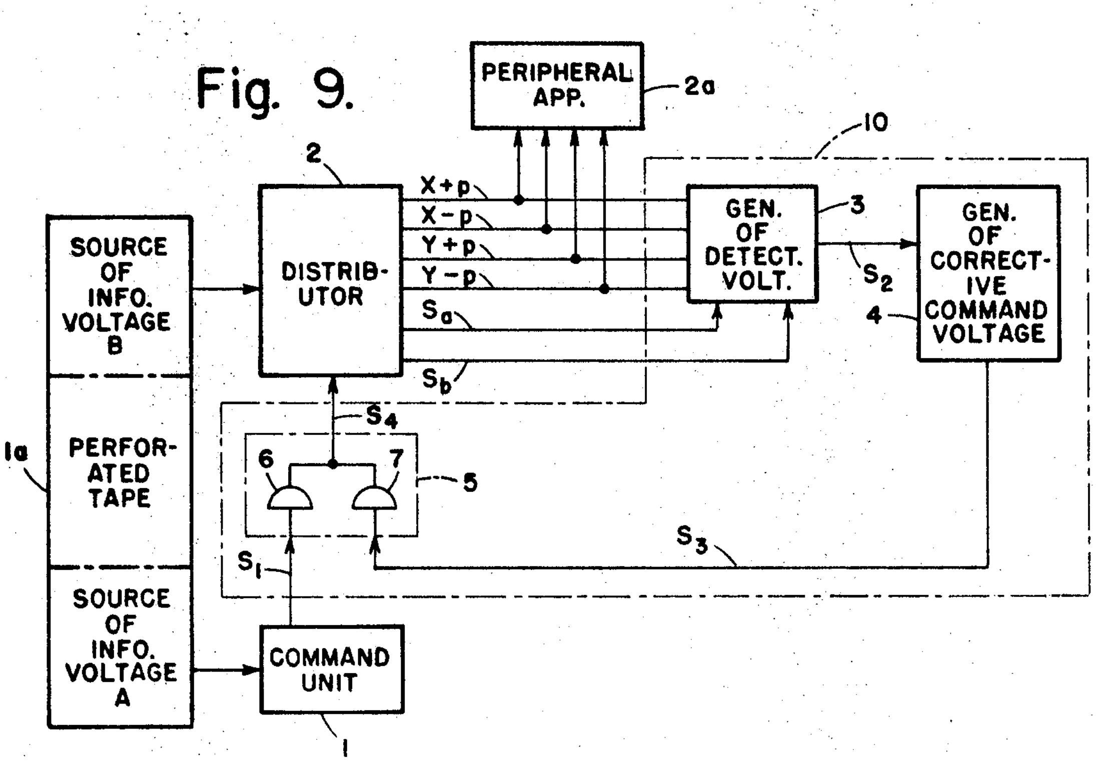
FIG. 9 is a box diagram of a digital interpolator according to the present invention.

Now an explanation is given in the following with reference to one example of the present invention in a circuit structure in which $n$=1/3 as indicated in FIG. 6. In FIG. 9, a command unit 1 generates a distribution command signal $S_1$ (for example, this signal is a series of pulses whose repetition period is 1/(command feed rate) as later mentioned, from a distribution command information A supplied by a suitable source 1a which is a perforated tape for the purpose of this explanation. The signal $S_1$ is fed via a gate 6 to a distributor 2. This distributor utilizes information B obtained from source 1a and a distribution command signal $S_1$ to generate distribution signal $x+p$ (a distribution pulse signal in the direction of $+x$; similar hereinafter), $x_{1p}$, $y_{+p}$ and $y_1p$. The information B prescribe the type of the curve to be traced, the followup sense, the start point, and the end point. Each of the distribution signal represents a direction of one step variation in one of the X and Y coordinates. Coded signals $S_a$ and $S_b$ represent the magnitudes of $a$ and $b$ components and are utilized for a purpose that is later mentioned. The distribution signals serve to activate a peripheral apparatus 2a (for instance, a stepping motor driving circuit).

In accordance with a specific embodiment of the present invention comprising a corrective distribution command device 10 shown in FIG. 9, second portions of the distribution signals $x_{+p}$, $x_{1p}$, $y_{+p}$ and $y_{1p}$ together with the coordinate signals $S_a$ and $S_b$ are supplied to a first means 3 which generates other output signals $S_2$, after first detecting that the distribution signal has been produced in a direction corresponding to component $b$ other than the direction corresponding to the maximum component $a$ of a tangential vector at a particular followup point in the case of this example shown in FIGS. 1 and 2. The signals $S_a$ and $S_b$ respectively indicate the magnitude of coordinate components $a$ and $b$ of the tangential vector as hereinbefore mentioned.

Figures 10, 11, 12:
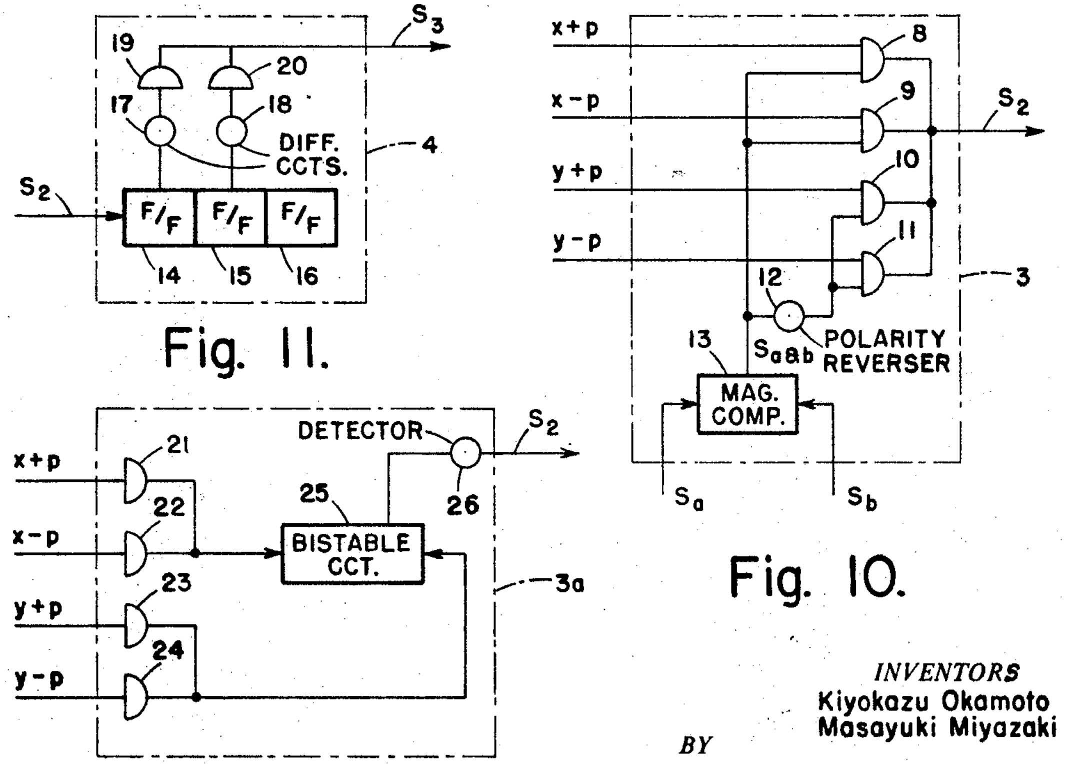
FIGS. 10, 11 and 12 are box diagrams of electric components usable in FIG. 9.

In one embodiment of the first generating means shown in FIG. 10, a comparator 13 compares the magnitudes of signals $S_a$ and $S_b$ to put a signal $S_{a \leq b}$ into the state of logical 1, when $a \leq b$ and to put the signal $S_{a \leq b}$ into the state of logical 0, when $a>b$, which signal $S_{a \leq b}$ is directly fed to AND gates 8 and 9 and via voltage polarity 12 (i.e. inverter) to AND gates 10 and 11. Thus, an output signal of the logical sum of the above-described other detection signal $S_2$ is obtained from the outputs of gates 8—11. The other detection signal $S_2$ is fed to a second means 4 which generates a series of corrective command signals $S_3$ having a number against the number of the other signal $S_2$ in the ratio of 3 to 2 in the foregoing example for FIG. 9 and distributed nearly uniformly with respect to the time.

FIG. 11 shows one embodiment of the second means 4 in which the signal $S_2$ is fed to a well-known ternary ring counter comprising conventional flip-flop circuits 14, 15 and 16. Assuming any one of the flip-flops 14, 15 and 16 is in a state of 1 while the remaining others are in a state of 0 at the moment, it is known that each time the detection signal $S_2$ is supplied to the input in FIG. 11, the state of 1 is moved to the next adjacent flip-flop cyclically in such sense as 14→15→16→14. When the state of flip-flop 14 or 15, for example, goes from 1 to 0, this change is so detected by conventional differential circuits with diodes 17 and 18 as to generate a pulse signal. This pulse signal, after passing gates 19 and 20, generates a corrective command signal $S_3$ having a number against a number of the other signal $S_2$ in the ratio of 3 to 2 as noted above. These corrective command signals $S_3$ are supplied to gate 7 of a third means 5 in which an output signal $S_4$ comprising the logical sum of the corrective command signal $S_3$ and the distribution command signal $S_1$ applied to gate 6 is obtained. This output signal $S_4$ is applied as a corrected distribution command signal to the distributor in place of the distribution command signal $S_1$ as above mentioned. Thus, the third means comprises gates 6 and 7 for providing the logical sum of the signals $S_1$ and $S_3$, respectively.

The operation of the apparatus in FIG. 9 is further explained in the following manner. Distribution command signals $S_1$ are generated from information A by command unit 1 with the time interval of 1/(command feed rate $Vo$); and corrected distribution command signals $S_4$ derived from the third means 5 in response to both the distribution command signal $S_1$ and corrective command signal $S_3$ are applied to distributor 2, wherein any one of the distribution signals $x_{+p}$, $x_{1p}$, $y_{+p}$ and $y_{1p}$ is generated in a time interval sufficiently shorter than that of $1/Vo$, and applied to the first means 3. When one of the distribution signals agrees with the above-described prescribed direction corresponding to component $b$ as noted above, the first means 3 generates detecting signal $S_2$. Second means 4 upon receiving the signal $S_2$ generates the corrective command signals $S_3$ which have the prescribed ratio (3 to 2 in this example) against the number of the detection signals $S_2$. Corrected distribution command signals $S_4$ generated in response to distribution command signal $S_1$ and corrective command signal $S_3$ at the third means 5 are applied to distributor 2. The generation of the next step distribution signals is completed before the next step distribution command signal is produced. The operation of FIG. 9 as just explained is an example corresponding to Equation (9).

The following explanation of FIG. 12 concerns a simpler embodiment 3a of first means 3 in FIGS. 9 and 10. As can be realized by referring to FIG. 1, 2 or 8, one of the features of a distribution pulse train due to distributor 2 is that the generation of a distribution signal does not occur successively in the prescribed $y$ (or $b$) direction as in FIGS. 1 and 2 for it may occur in the prescribed $y$ (or $b$) direction between point $P_{S4}$ and point 9 and in the $x$ (or $a$) direction between point 9 and point $P_{E4}$ in FIG. 8. This indicates that the change of direction may be not only from the above-mentioned prescribed direction ($y$ or $b$ components in FIGS. 1 and 2) to a direction ($x$ or $a$ component in FIGS. 1 and 2) other than thereof; but the change of direction may also be toward the prescribed direction ($y$ or $b$ component in FIG. 8) from a direction ($x$ or $a$ component in FIG. 8) other than thereof, with each of the signals $S_2$ and $S_3$ having the same number for each of the opposite directions in FIG. 8 as the number of the signals $S_2$ and $S_3$ for the prescribed direction in FIGS. 1 and 2. Accordingly, in order to detect the above-described change of direction, distribution signals $x_{+p}$, $x_{1p}$, $y_{+p}$ and $y_{1p}$ are used via gate pairs 21 and 22 and 23 and 24 as set and reset signals for a bistable circuit 25 in such a manner that by detecting the change via a suitable detector 26 in the prescribed direction of the one side output of bistable circuit 25 by differential circuit 26, the detection signal $S_2$ is obtained from the output of the latter circuit 26.

Although the foregoing explanation was aimed at a quadratic curve as an example, it will be shown in the following that the present invention can be applied to a cubic curve. In the first place, an equation corresponding to Equation (2) is $$v=\frac{V}{V_0}=\frac{\sqrt{a^2+b^2+c^2}}{|a|+|b|+|c|},\ \text{where}\ (|a|+|b|+|c|\neq 0) \qquad (10)$$

When $a=b=c$, then normalized feed rate $v$ becomes minimum as follows:

$$v_{\min}=\frac{\sqrt{3}}{3}\cong 0.58$$

This indicates that the deviation E between the command feed rate $V_o$ and the actual feed rate V amounts approximately to 42 percent.

If a linear form is used as a method of transforming the term $|a|+|b|+|c|$ which corresponds to the time duration of Equation (10) and if $n=1/3$ is assumed so that a curve may agree with Equation (9) when any of $a$, $b$ and $c$ is zero, namely when said curve is quadratic, then an expression corresponding to Equation (9) will be $$v_c=\frac{\sqrt{a^2+b^2+c^2}}{|a|+|b|+|c|-2/3(|b|+|c|)}$$

where $$|a|\geq|b|\geq|c| \quad (11)$$

The distribution signal in the prescribed direction on the condition of $|a|\geq|b|\geq|c|$ is a distribution signal corresponding to $b$ and $c$. Now $$\left.\begin{aligned}\frac{\partial v_c}{\partial|b|}&=\frac{3|a||b|+|b||c|-a^2-c^2}{3(|a|+|b|+|c|)\sqrt{a^2+b^2+c^2}}\\ \frac{\partial v_c}{\partial|c|}&=\frac{3|a||c|+|c||b|-a^2-b^2}{3(|a|+|b|+|c|)\sqrt{a^2+b^2+c^2}}\end{aligned}\right\} \quad (12)$$

Owing to the above equations, $v_c$ becomes a minimum, i.e., $v_{c\,min}\cong0.91$ when $|b|=|c|=1/3|a|$, its deviation E being approximately 9 percent; and $v_c$ becomes a maximum, i.e., $v_{c\,max}\cong1.04$ when $|b|=|c|=|a|$, its deviation E being approximately 4 percent. As a result, it is seen that the maximum deviation E is $E_{max}\cong9$ percent. It shows that this value is remarkably improved as compared with the deviation E of 42 percent corresponding to $v_{min}\cong0.58$ as above mentioned.

As explained in the case of quadratic curve, it is also the same in the case of a cubic curve so that $n$ can be determined depending upon the objective. For instance, when $|a|\geq|b|\geq|c|$, then the term $|a|+|b|+|c|$ corresponding to the time duration may be transformed into the form of $|a|+n_1\cdot|b|+n_2\cdot|c|$ and the values of $n_1$ and $n_2$ may be determined depending upon the objective.

It is understood that the invention herein is described in specific respects for the purpose of this description. It is also understood that such respects are merely illustrative of the application of the invention. Numerous other arrangements may be devised by those skilled in the art without departing from the spirit and scope of the invention.

We claim:

1. A digital interpolator having a command unit, responsive to the information A prescribing a command feed rate, for generating a series of distribution command signals, said signals occurring at said command feed rate, and a distributor, responsive to the information B and supplied with the distribution command signals, said information B prescribing the curve to be followed up, the coordinates of followup points positioned within the adjacency of said curve, and the one-step coordinate variations assigned to the respective followup points, for generating a series of distribution signals, said distribution signals indicating said coordinate variations, respectively, wherein the improvement comprises a corrective distribution command device in turn comprising:

first means, supplied with said series of distribution signals, for detecting the direction of the maximum component of the tangential vector at the followup point to which each of the supplied distribution signal is assigned and for generating a series of detection signals whenever the direction of the coordinate variation indicated by each of the supplied distribution signal is different from the detected direction, second means, supplied with said series of detection signals, for generating a series of corrective command signals, a predetermined number of said corrective command signals occurring for another predetermined number of said detection signals, said corrective command signals occurring substantially uniformly with time, and third means, interposed between said command unit and said distributor and supplied with said series of distribution command signals and said series of corrective command signals, for producing a series of corrected distribution command signals, said corrected distribution command signals being the logical sum of said distribution command signals and said corrective command signals, and for supplying said series of corrected distribution command signals to said distributor in place of the distribution command signals supplied by said command unit directly to said distributor.

2. Apparatus activated by successive voltages representing sequential steps in X and Y coordinates for tracing a new operation from a prototype operation in a given time period, comprising:

a source of first and second series of information voltages, each of said first voltages prescribing a distribution command voltage and each of said second voltages prescribing a type of said new operation to be traced from said prototype operation;

means for translating said first series information voltages into a series of command feed rate voltages, each having a time interval of 1/command feed rate voltage $V_o$;

means for translating said second series of information voltages and series command rate voltages into a series of distribution voltages and a series of actual feed rate voltages V, each of said distribution voltages representing a variation of one step in one of said X and Y coordinates of said new operation as traced from a corresponding step of said prototype operation and each of said voltages actual feed rate voltages V having magnitudes representing one followup point of a plurality of followup points constituting comprising coordinate said X and Y coordinates of said new operation;

means for utilizing first portions of said distribution voltages to trace said new operation in such manner that said last-mentioned operation deviates from said prototype operation in correspondence with variations in the difference in magnitude between said command feed rate and actual feed rate voltages $V_o$ and V, respectively, in said given time period;

and means for applying a series of corrected command feed rate voltages to said second series information voltage and series command rate voltage translating means to decrease the deviation of said newly traced operation from said prototype operation in correspondence with a decrease in the difference magnitude between said command and actual feed rate voltages $V_o$ and V, respectively, each of said corrected command rate voltages comprising the logic sum of one of said command feed rate voltages and a preselected number of corrective voltages derived from said coordinate voltages and second portions of said distribution voltages translated for a preselected direction relative to a direction corresponding to a maximum component of a predetermined coordinate of a vector having said X and Y coordinates at each of said followup points.

3. The apparatus according to claim 2 in which said second portions of said distribution voltages are translated for said preselected direction comprising the Y coordinate relative to the direction corresponding to the maximum component of said predetermined coordinate comprising the X coordinate of said vector having said X and Y coordinates at each of said followup points.

4. The apparatus according to claim 2 in which said second portions of some of said distribution voltages are translated for said preselected direction comprising the Y coordinate relative to the direction corresponding to said maximum component of said predetermined coordinate comprising the X coordinate of said vector having said X and Y coordinates at each of certain followup points and said second portions of others of said distribution voltages are translated for said preselected direction comprising the X coordinate relative to the direction corresponding to said maximum component of said predetermined coordinate comprising the Y coordinate of said vector having said X and Y coordinates of each of followup points which are different from said last-mentioned certain followup points.

5. The apparatus according to claim 2 in which said preselected number of corrective voltages is 3.

6. The apparatus according to claim 2 in which each of said corrected command rate voltages comprises the logic sum of one of said distribution command rate voltages and three of said corrective voltages.

7. The apparatus according to claim 2 in which said corrected voltage applying means comprises means for translating said coordinate voltages and second portions of said distribution voltages translated for a preselected direction relative to a direction corresponding to said maximum component of said predetermined coordinate of said vector having said X and Y coordinates at said followup points into other voltages from which said corrective voltages are derived.

8. The apparatus according to claim 7 in which said corrected voltage applying means also includes means for translating said other voltages into said corrective voltages, said corrective voltages relative to said other voltages translated according to a predetermined ratio.

9. The apparatus according to claim 8 in which said predetermined ratio is 3 to 2.

10. The apparatus according to claim 8 in which said corrected voltage applying means includes a logic sum network comprising two AND gates having a common output connected to an input of said second and command feed rate voltage translating means, one of said AND gates having an input connected to an output of said command rate voltage means and a second of said AND gates having an input connected to an output of said other voltage translating means, said last-mentioned network providing said logic sum of said one of said command feed rate voltages and preselected number of corrective voltages to said last-mentioned voltage translating means.

11. The apparatus according to claim 2 in which said corrected voltage applying means includes means for translating said coordinate voltages and second portions of said distribution voltages translated for said preselected direction relative to the direction corresponding to said maximum component of said predetermined coordinate of said vector having said X and Y coordinates at each of said followup points into other voltages;

means for translating said other voltages into said corrective voltages in such manner that said last-mentioned voltages relative to said other voltages have a ratio of 3 to 2;

and logic means for applying said logic sum of said one command feed rate voltages and preselected number of corrective voltages to said second and command feed rate translating means, comprising two AND gates having a common output connected to said last-mentioned translating means, one of said AND gates having an input connected to an output of said command rate voltage means and a second of said AND gates having an input connected to an output of said other voltage translating means.

12. Apparatus activated by successive voltages representing sequential steps in X and Y coordinate axes for tracing a new curve from a prototype curve in a given time period, comprising:

a source of first and second series of information voltages, each of said first voltages prescribing a distribution command voltage and each of said second voltages prescribing a type of said new curve to be traced from said prototype curve;

means for utilizing said first information voltages to generate a series of command feed rate voltages, each having a time interval of 1/command feed rate voltage $V_o$;

means for using said series of second information voltages and series of command rate voltages to generate a series of distribution voltages and a series of actual feed rate voltages V, each of said distribution voltages representing a variation of one step in one of said X and Y coordinates of said new curve as traced from a corresponding step of said prototype curve and each of said actual feed rate voltages V comprising coordinate voltages having magnitudes representing one followup point of a plurality of followup points constituting said X and Y coordinates of said new curve;

means for utilizing first portions of said distribution voltages to trace said new curve in such manner that said last-mentioned curve deviates from said prototype curve in correspondence with variations in the difference in magnitude between said command and actual feed rate voltages $V_o$ and V, respectively;

and means applying a series of corrected command feed rate voltages to said second and command rate voltage translating means for decreasing the difference magnitude between said command and actual feed rate voltages $V_o$ and V, respectively, to decrease the deviation of said new curve from said prototype curve in correspondence with said last-mentioned decreasing voltage difference magnitude, comprising means for detecting said coordinate voltages and second portions of said distribution voltages generated for a preselected direction relative to a direction corresponding to a maximum component of a predetermined coordinate of a vector having said X and Y coordinates at said followup points to generate other voltages;

means for translating said other voltages into corrective command voltages in such manner that said last-mentioned voltages have a ratio of 3 to 2 relative to said other voltages;

and logic means for applying a logic sum of said command feed rate and corrective command voltages to said second and command rate voltage using means; said logic means comprising two AND gates having a common output connected to said last-mentioned using means, one of said AND gates having an input connected to said output command rate voltage means and a second of said AND gates having an input connected to an output of said other voltage translating means.

13. The apparatus according to claim 12 in which said prototype curve is a rectilinear line.

14. The apparatus according to claim 12 in which said prototype curve is a curvilinear line.

15. The apparatus according to claim 12 in which said detecting means comprises four AND gates, each of which is supplied with one of said distribution voltages indicating the direction of one step in one of said X and Y coordinates, at each of said followup points of said new curve as traced from said prototype curve;

means for receiving and comparing the magnitudes of the coordinate voltages of said X and Y coordinates at each of said followup points and supplying a first portion of an output voltage to first and second gates of said four AND gates and a second portion of said last-mentioned voltage reversed in polarity to third and fourth gates of said four AND gates;

and a common output of said four AND gates providing said other voltages.

16. The apparatus according to claim 12 in which said corrective voltage means comprises a ternary counter circuit including three flip-flop circuits of which a first has an input connected to an output of said detecting means and two outputs, a second has an input connected to one of said two outputs of said first flip-flop circuit and two outputs, and a third has an input connected to one of said two outputs of said second flip-flop circuit, two voltage differential circuits of which one has an input connected to the second output of said first flip-flop circuit and the other has an input connected to the second output of said second flip-flop circuit, and two AND gates of which one has an input connected to an output of said one differential circuit and the other has input connected to an output of said other differential circuit, and said two AND gates have a common output circuit supplying said corrective command voltages to said input of said second AND gate of said logic means.

PO-1050
(5/69)

UNITED STATES PATENT OFFICE
CERTIFICATE OF CORRECTION

Patent No. 3,576,981 Dated May 4, 1971

Inventor(s) KIYOKAZU OKAMOTO ET AL

It is certified that error appears in the above-identified patent and that said Letters Patent are hereby corrected as shown below:

Column 3, line 4, "$a^2+qb^2$" should be --$\sqrt{a^2+b^2}$--;

line 51, "$1+k^1(1+k)^m$," should be --$1+k^1$, $(1+k)^m$,--.

Column 4, line 4, "n(=nao)" should be --$n(=n_o)$--;

line 46, after "Fig. 7" insert a semicolon (;).

Column 5, line 11, "$\sqrt{1+k_1^2/1}+1=1$" should be --$\sqrt{1+k_1^2/1}+nl$ line 25, "$y_{1p}$" should be --$y_{-p}$--;

line 37, "$x_{1p}$" should be --$x_{-p}$--,

"$y_{1p}$" should be --$y_{-p}$--.

Column 6, line 16, "$x_{1p}$" should be --$x_{-p}$--;

lines 17 and 52, in each, "$y_{1p}$" should be --$y_{-p}$--, line 70, insert a period (.) after the equation.

Column 7, line 8, insert a period (.) after the equation;

line 12, insert a comma (,) before brackets at the enc line;

line 14, insert a period (.) before brackets at the end line.

Signed and sealed this 26th day of October 1971.

(SEAL)
Attest:

EDWARD M.FLETCHER,JR.
Attesting Officer

ROBERT GOTTSCHALK
Acting Commissioner of Pate